(12) United States Patent
Louvel

(10) Patent No.: US 8,860,397 B2
(45) Date of Patent: Oct. 14, 2014

(54) METHOD OF FORMING A SEMICONDUCTOR DEVICE AND STRUCTURE THEREOF

(75) Inventor: Jean-Paul Louvel, Colomiers (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 322 days.

(21) Appl. No.: 13/468,226

(22) Filed: May 10, 2012

(65) Prior Publication Data

US 2013/0300387 A1 Nov. 14, 2013

(51) Int. Cl.
*H02M 7/217* (2006.01)

(52) U.S. Cl.
USPC .......................... 323/300; 363/146; 323/237

(58) Field of Classification Search
CPC .... H02M 1/081; H02M 1/082; H02M 7/2176
USPC .............. 323/300, 237, 241; 363/89, 127, 46, 363/146
See application file for complete search history.

(56) References Cited

U.S. PATENT DOCUMENTS

| | | | |
|---|---|---|---|
| 5,818,708 A * | 10/1998 | Wong | 363/89 |
| 8,115,457 B2 | 2/2012 | Balakrishnan et al. | |
| 2012/0201055 A1* | 8/2012 | Moon et al. | 363/21.02 |

OTHER PUBLICATIONS

Data Sheet, Supertex inc., SR087 Adjustable Off-Line Inductorless Switching Regulator, © 2010 Supertex inc., Doc.#DSFP-SR087 C051410, 7 pgs.

* cited by examiner

*Primary Examiner* — Harry Behm
(74) *Attorney, Agent, or Firm* — Robert F. Hightower

(57) ABSTRACT

A power control circuit and method of formation is provided, which in one embodiment includes a low voltage detection circuit to process a rectified input voltage from at least one alternating current (AC) voltage source and to output a low voltage indication signal upon detection of an initiation of an increase in the rectified input voltage; and a driver circuit configured to receive a signal representative of the low voltage indication signal and, in response, to output a drive signal to the switch control input of the power switch to turn on the power switch.

16 Claims, 4 Drawing Sheets

METHOD OF FORMING A SEMICONDUCTOR DEVICE AND STRUCTURE THEREOF

BACKGROUND OF THE INVENTION

The present invention relates, in general, to electronics, and more particularly to semiconductors, structures thereof, and methods of forming semiconductor devices.

Switched mode power supplies (e.g., AC-DC adapters) are facing ever more stringent power requirements at different output conditions and, particularly, under no load conditions. However, many such power supplies have limited current capability for dynamic system supply, require high voltage supply for startup, experience a high voltage drop and power dissipation on high voltage generator any of which may contribute to a low efficiency for high voltage startup and dynamic system supply. Thus, it is desirable to have a method of forming a load switch controller and structure thereof that has low power consumption under no load conditions. Additionally, it may be beneficial for the structure to be economically manufactured and to be easily integrated into preexisting circuit designs.

DETAILED DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and implementations or embodiments shown. In the drawings:

FIG. 4 illustrates an enlarged plan view of a semiconductor device that includes the circuit of FIG. 1 in accordance with an example embodiment of the present invention.

Figure 1:
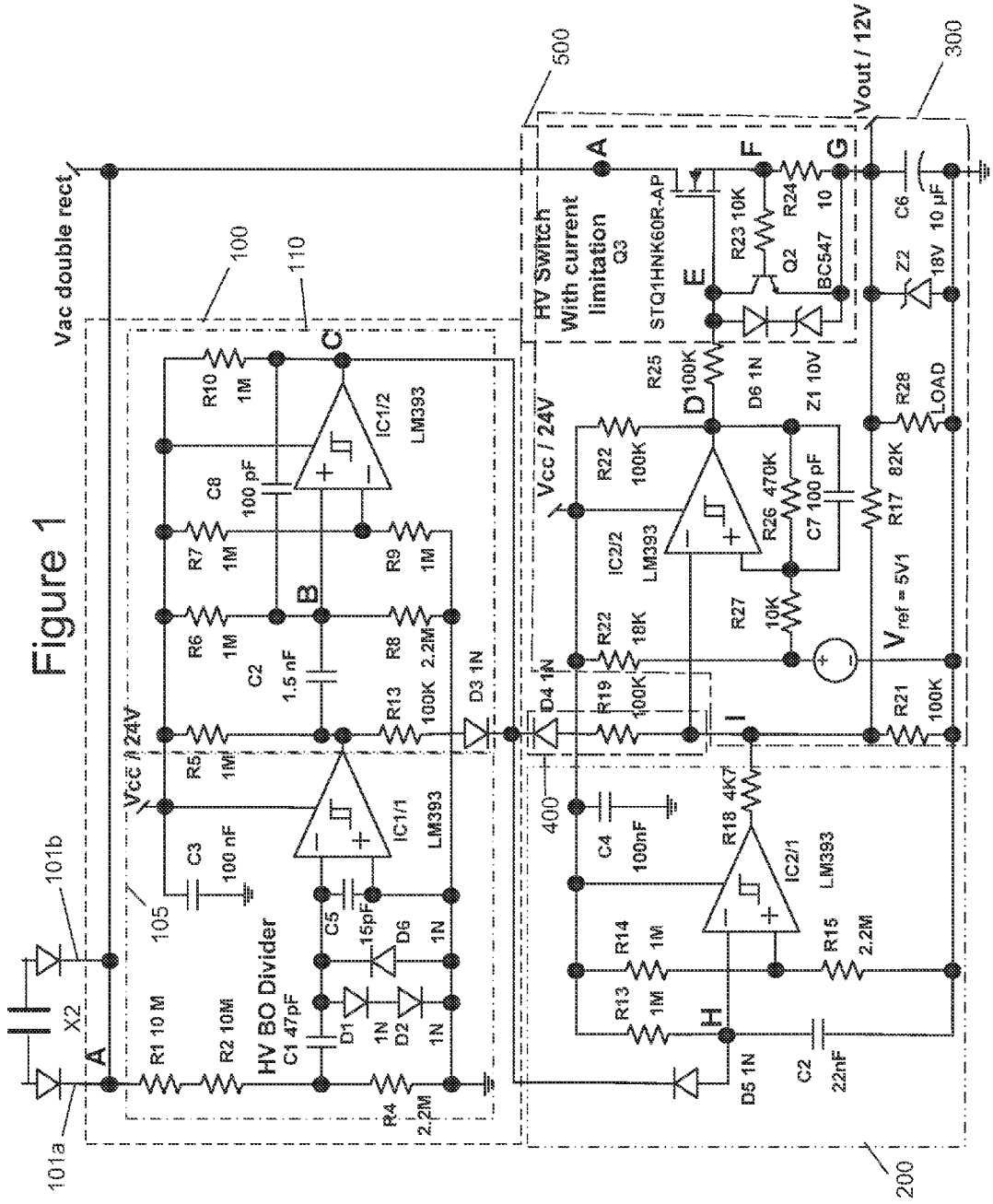
FIG. 1 is a block diagram of a circuit in accordance with a first example embodiment of the present invention.

For simplicity and clarity of the illustration, elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there are always minor variances that may prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and inactive means an inactive state of the signal. The actual voltage value or logic state (such as a "1" or a "0") of the signal depends on whether positive or negative logic is used. Thus, "asserted" can be either a high voltage or a high logic or a low voltage or low logic depending on whether positive or negative logic is used and "negated" may be either a low voltage or low state or a high voltage or high logic depending on whether positive or negative logic is used. Herein, a positive logic convention is used, but those skilled in the art understand that a negative logic convention could also be used. The terms "first", "second", "third" and the like in the Claims or/and in the Detailed Description of the Drawings, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. For clarity of the drawings, doped regions of device structures are illustrated as having generally straight line edges and precise angular corners. However, those skilled in the art understand that due to the diffusion and activation of dopants the edges of doped regions generally may not be straight lines and the corners may not be precise angles.

DETAILED DESCRIPTION OF EXAMPLE EMBODIMENTS

In the following description, for purposes of explanation and not limitation, specific details are set forth, such as particular signals, circuits, circuit arrangements, thresholds, components, operation modes, techniques, protocols, hardware arrangements, either internal or external, etc., in order to provide a thorough understanding of the present invention.

However, it will be apparent to one skilled in the art that the present invention may be practiced in other embodiments that depart from these specific details. Detailed descriptions of well-known signals, circuits, thresholds, components, operation modes, techniques, protocols, and hardware arrangements, either internal or external, etc., are omitted so as not to obscure the description.\

Example embodiments of the present invention provide an efficient power supply by reducing the voltage drop on the switch during ON time. In some embodiments, this may be accomplished by turning the power switch on at a low input voltage to thereby reduce the voltage drop across the switch. In some example embodiments this may be implemented using the alternating current (AC) voltage supply to obtain a lower voltage (e.g., at or near the lowest possible voltage of the combined two phase voltage sources), detecting the AC supply voltage phase to get synchronization with the lowest supply voltage (e.g., of the two mains voltage sources), using a solution that prevents the supply voltage form going to zero volts (thereby avoiding parasitic capacitance effects), and providing the synchronization signal to a hysteric regulator to turn on (i.e., force conduction of) the switch with a low (or the lowest or other desired) input voltage supply. In addition, some embodiments increase the maximum current through the switch to reduce conduction time to thereby further reduce the average voltage drop across and power dissipation by the switch.

FIG. 1 depicts an example embodiment of the present invention which includes four circuits. More specifically, this example embodiment includes a low voltage detection circuit 100, a capacitor discharge control circuit 200, a hysteretic regulator driver circuit 300, and the low synchronization voltage circuit 400. These circuits are configured to control the power switch circuit 500.

The low voltage detection circuit 100 receives a first rectified AC voltage input 101a and a second rectified AC voltage input, which are combined (added) at point A to provide a combined rectified AC voltage. While the voltages are AC, the combined rectified AC voltage at point A never reduces to zero due to the very low consumption and the parasitic capacitors.

The low voltage detection circuit 100 is configured to detect a low combined rectified AC voltage at point A (over a given time period such as a cycle, a half cycle, etc.). Point A of the low voltage detection circuit 100 is connected to the first current carrying electrode of the transistor Q3 of the power switch 500. Thus, by turning the power switch 500 (i.e., transistor Q3) ON at the low voltage detected at point A, the voltage drop across the switch 500 when turned ON will be lower than if the switch was turned ON at a time when the voltage was higher. This particular example circuit 100 includes a voltage increase detection circuit 105 (which includes comparator IC1/1)—which is fed by a high voltage (HV) brown out divider circuit (comprised of R1, R2 and R4)—for detecting the initiation of a voltage increase and a hysteretic comparator circuit 110 (which includes comparator IC 1/2), which conditions the output of the voltage increase detection circuit to provide the proper form and timing of the outputted synchronization pulse.

Figure 2:
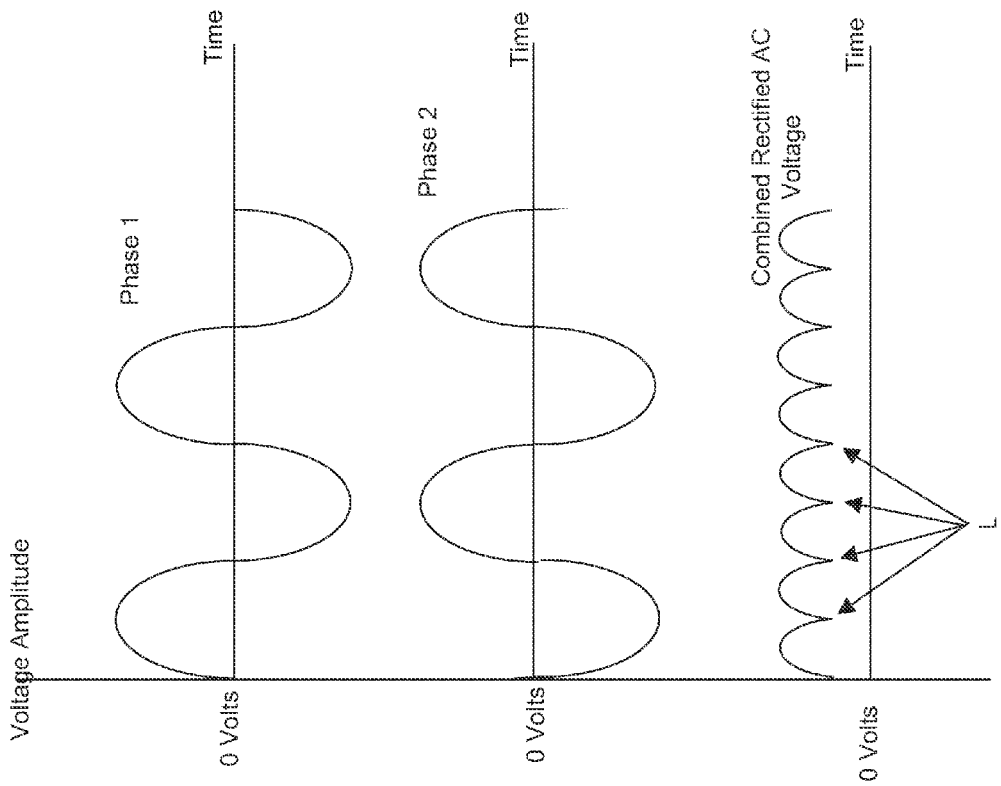
FIG. 2 depicts waveforms for explanation of the example embodiment of FIG. 1 of the present invention.

The low voltage detection circuit 100 may implemented by the illustrated circuit which detects an initiation of an increase in the combined rectified AC voltage. In other words, the low voltage detection circuit 100 may be configured to detect the slope of the combined rectified AC voltage becoming positive. FIG. 2 illustrates a first and second AC phase as well as a combined rectified AC voltage such as what might be present at point A in some embodiments and scenarios. It is worth noting that the depiction of the combined rectified AC voltage of the bottom graph is not to scale and does not represent an actual measured waveform and provided only for explanatory purposes.

As illustrated in the bottom graph of FIG. 2, due to the parasitic overall capacitance and very low current/consumption, the combined rectified AC voltage typically does not drop to zero (and, for example, may stay above 100V in embodiments where the AC voltage sources are 230 V AC). The low voltage detection circuit 100 detects each low voltage (indicated by L) of the combined rectified AC voltage by, for example, detecting the initiation of an increase in the combined rectified AC voltage or (via) detecting a change in the slope of the combined rectified AC voltage to positive. Upon detecting the initiation of an increase in the combined rectified AC voltage, the low voltage detection circuit may output a low voltage indication which may comprise, for example, a low voltage pulse at point C of circuit 100.

Because the lower voltage level is dependant on a variety of conditions, this example circuit detects the voltage at point A beginning to increase (e.g., changing from a negative slope to a positive slope) in order to detect the lowest voltage level.

Other embodiments may detect a low voltage using other circuitry which may or may not detect a change in slope or beginning of an increase in the voltage. For example, in another embodiment the circuit may be replaced with a digital solution.

Other embodiments may detect the voltage level instead of detecting the initiation of an increase in the voltage. However, if the circuit 100 monitors the voltage level, it may be difficult to obtain the appropriate voltage level for both 110 V and 230 V in that a voltage level would need to be low enough to provide a low voltage source for 110 V voltage input(s) but high enough to be used with 230 V AC input(s). Thus, detecting the beginning of an increase of the voltage at point A overcomes that difficulty.

Referring again to FIG. 1, the X2 capacitor discharge control 200 facilitates discharging of the X2 capacitor. The IC2/1 of the X2 capacitor control circuit 200 is a timer built around the charging of capacitor C2 via R13. While voltage is supplied by inputs 101a and 101b at point A, each negative pulse received from point C causes a reset of the timer (implemented by C2 and R13) at point H through D5 by pulling the voltage down at point H. If the voltage inputs 101a and 101b drop to zero, the voltage at point H increases above the positive (+) input of IC2/1 to cause the output of the IC2/1 to drop thereby driving down the negative input (−) of IC2/2 such that the HV switch (Q3) is switched ON to discharge the X2 capacitor into C6. The voltage applied to C6 is limited by Z2 which will absorb the energy of X2 Capacitors transferred though the switch 500 in C6.

In this embodiment, C2+R13 have a high time constant (e.g., slightly greater than the period of the voltage source 101) such that the voltage at point H is not above positive input (+) of IC2/1 if there is a low voltage indication signal (e.g., a low pulse) to discharge capacitor C2 at any 100/120 Hz cycles. However, when the input voltage is removed (or zero), the voltage at capacitor C2 rises because the low voltage indication signal is no longer available. When the voltage at point H is rises above the positive input (+) of IC2/1, the output voltage drops such that through R18, the voltage at point I drops, thereby causing transistor Q3 of power switch 500 to be switched ON to discharge X2 capacitor. It is worth noticing that the X2 capacitor discharge circuit 200 need not be present in all embodiments of the present invention.

The hysteretic switching regulator 300 acts as a driver circuit and may comprise a linear regulator. The hysteretic switching regulator 300 is indicated in FIG. 2 by the contents of block 300 but excluding the contents of block 500 (which form the power switch 500). The high voltage power MOS Q3 of the power switch 500 has a current limitation (to avoid over power and destruction), which is implemented by transistor Q2 which reduces the gate voltage of transistor Q3 when the current is over the limit defined by resistor R24. The comparator IC2/2 drives the transistor Q3 according to the feedback from regulated $V_{cc}$ on its negative input (−) and the reference voltage (e.g., 5.1 volts) on the positive input (+). To reduce power dissipation, this example embodiment utilizes hysteresis (some ripple on $V_{cc}$) defined by R26 and R27. The switch (Q3) is switched ON as soon as the voltage at the negative input (−) (i.e., the feedback input) of IC2/2 drops below the reference voltage at reference input (i.e., the positive input pin (+)).

The conduction time of the switch (Q3) is linked to the peak current allowed through the switch 500 (for a given rms needed current). As the voltage will follow the (rectified) sinusoidal form (given by the AC supply), the supply voltage (and the power dissipation) will be larger at the end of the conduction of the switch. By allowing a higher peak current through the switch 500, the conduction time may be shorter and the average voltage supply lower such that efficiency may be improved. In other words, with a larger peak current through the switch 500, the time necessary to provide the same average current will be shorter thereby allowing power reduction as the switch is working in linear mode (due to current limitation). It is worth noting that without hysteresis, the regulator 300 will barely provide the needed DC current and providing a lower current will cause the switch 500 to be on more (e.g., 100% of the time) with a higher voltage drop. With hysteresis, the circuit will work in skip mode, providing large current during ON time but with a longer OFF time with overall reduced power dissipation and improved efficiency. The hysteretic switching regulator 300 represents a discreet solution of an hysteretic power supply. Other embodiments may employ circuits that provide behaviors to provide a regulated $V_{cc}$ from the input supply voltage.

The low voltage synchronization circuit comprises a resistor R19 in series with diode D4 that connects point C to the negative (−) input of IC2/2 (which drives the switch 500). As explained above, the power switch 500 is turned on as soon as the voltage at the negative input (−) of IC2/2 drops below the reference (or positive) input (+). If a negative pulse is provided by the lowest input supply voltage to the negative input (−) of IC2/2, the power switch 500 will be turned on and thereby the switch will be synchronized to the lowest input supply voltage at point A. However, the amplitude of the negative pulse should be large enough to cause the switch 500 to be turned on as desired but not so large as cause the switch 500 to be activated when the input voltage at point A is too far away from the low voltage "natural" trigger point (the beginning of a voltage increase at point A).

In other words, the synch pulse amplitude (and duration) should be defined to secure that the switch 500 will not be forced to switch ON again before next low voltage supply point (to be defined according to $V_{cc}$ capacitor and consumption). Thus, the low synchronization voltage circuit 400 ensures that the voltage supplied to the negative input (−) of the regulator IC2/2 is provided for the appropriate time and with the appropriate amplitude to ensure that the switch 500 is turned on in synchronization with the lowest input supply voltage (at point A) to thereby reduce power consumption.

If the $V_{cc}$ is much higher than the nominal value, it may be desirable to skip turning on the power switch 500 for the cycle and wait for the next cycle to avoid over voltage on $V_{cc}$. This is implemented in this embodiment with a simple diode D4 that reduces the regulation signal to the hysteric switching regulator circuit 300. A series resistance R19 limits the effect and avoids the regulator circuit 300 to be switched ON if $V_{cc}$ is much too high to thereby wait for the next cycle. A lower resistance value for R19 may force the regulator circuit 300 to be switched ON by any of the 100/120 Hz cycle. Thus, the voltage synchronization circuit receives the low voltage indication signal (a low pulse) and conditions the received signal to be at the appropriate magnitude and duration to be supplied to the negative input of IC2/2.

Figure 3:
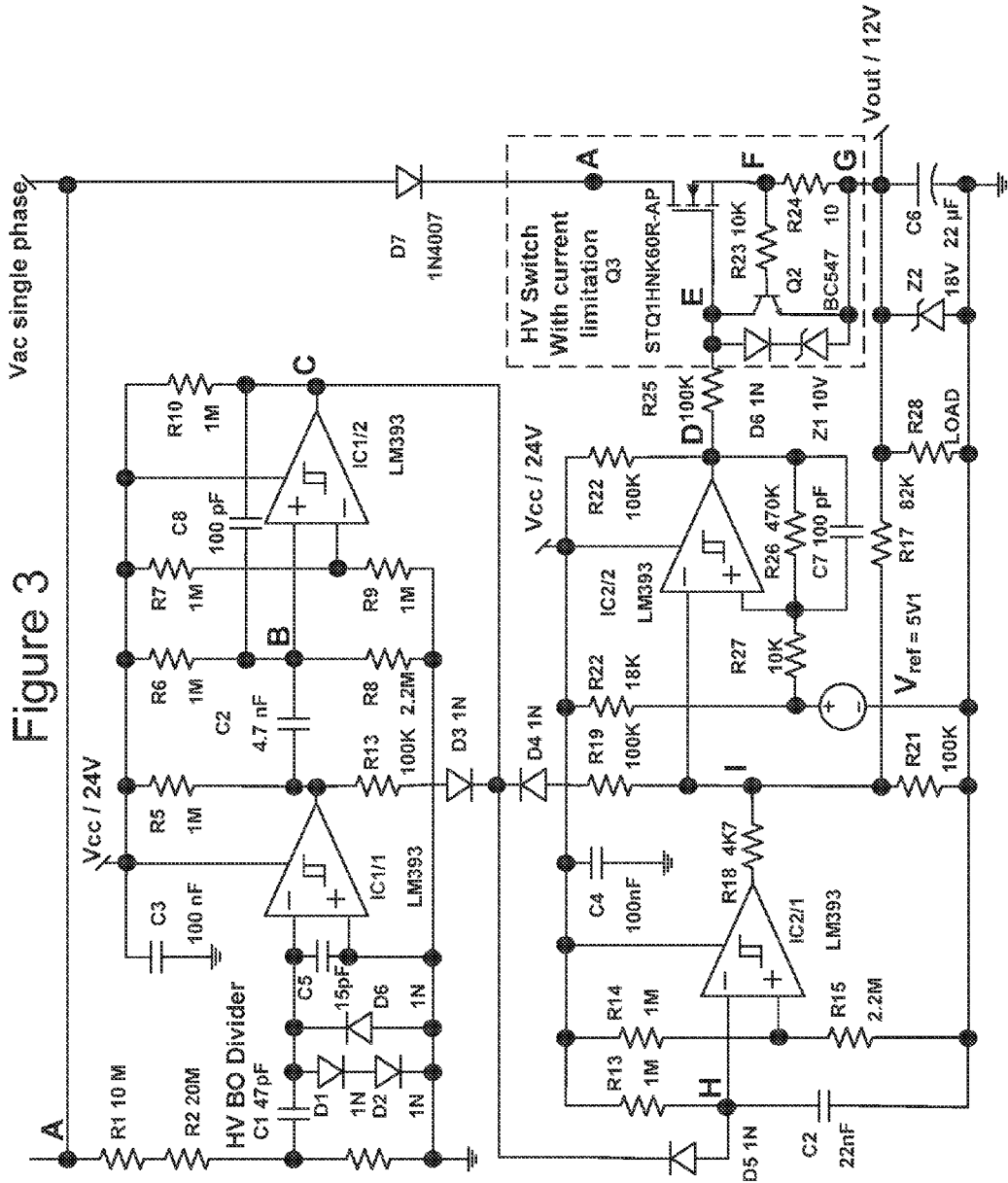
FIG. 3 is a block diagram of another circuit in accordance with an example embodiment of the present invention.

While the above example embodiment has been described in the context of two phase AC inputs (inputs 101a and 101b), other embodiments of the present invention may be used with a single phase AC input. Such an embodiment will receive a single phase supply and is illustrated in FIG. 3. Consequently, such an embodiment may have much higher $V_{cc}$ capacitor (C3) to avoid voltage drop outs of the $V_{cc}$ because the input voltage is supplied for half of the time of the two phase supply. However, this may improve the efficiency with real zero voltage switching. In addition, without double phase rectification, some such circuits may not be able to manage the X2 capacitor discharge.

FIG. 4 illustrates an enlarged plan view of a portion of an embodiment of a power switch controller circuit 20 formed on a semiconductor die 96. Semiconductor die 96 may also include other circuits that are not shown in FIG. 3, such as the power switch 500, for simplicity of the drawing. Power switch controller circuit 20 may be formed on die 96 by semiconductor manufacturing techniques that are well known to those skilled in the art. In one embodiment, Power switch controller circuit 20 is formed on a semiconductor substrate as an integrated circuit having eight or ten external leads.

While the subject matter of the invention is described with specific example embodiments, the foregoing drawings and descriptions thereof depict only typical embodiments of the subject matter and are not therefore to be considered to be limiting of its scope, it is evident that many alternatives and variations will be apparent to those skilled in the art. For example, the subject matter has been described for a particular MOS transistor, although the invention is directly applicable to other devices that may use other types of transistor such as for example, NPN transistors, insulated gate bipolar transistors (IGBT), HFETs, and/or other switches (e.g., transistors) that require a positive voltage to turn on. While the example embodiments of the present invention have be described in the context of analog circuitry, other embodiments may employ digital circuitry.

From the foregoing one skilled in the art can determine that according to one embodiment, a power switch controller is provided, comprising a low voltage detection circuit to receive a combined rectified alternating current (AC) voltage provided by a first rectified AC input voltage combined with a second rectified AC input voltage. The low voltage detection circuit configured to output a low voltage indication signal upon detection of an initiation of an increase of the combined rectified AC voltage. The power controller circuit may further include a low voltage synchronization circuit configured to receive and condition the low voltage indication signal and to output a synchronization pulse; and a hysteretic regulator circuit configured to receive the synchronization pulse and, in response, to output a drive signal to the switch control input of the power switch to turn on the power switch. The power controller circuit may further include a discharge control circuit configured to receive the low voltage indication signal and, if the low voltage indication signal is not received for a predetermined time period, to output a discharge signal to cause the power switch to turn on to discharge a capacitor. The hysteretic regulator circuit may be configured to receive the discharge signal and, in response, to output the drive signal to turn on the power switch to discharge the capacitor.

The power switch may comprise a transistor having first current carrying electrode configured to receive the combined rectified AC voltage. The low voltage detection circuit may comprise a comparator circuit configured to receive the combined rectified AC voltage and to detect the initiation of an increase in the combined rectified AC voltage. The hysteretic regulator circuit may comprise a comparator circuit comprising a first input configured to receive the synchronization pulse; a second input connected to a reference voltage source; and a first output configured to output the drive signal in response to receiving a voltage the first input that satisfies voltage threshold defined, at least in part, by the reference voltage. Further, the low voltage synchronization circuit may include a diode having a first port configured to receive the low voltage indication signal and a second port connected to the first input of the comparator circuit.

Those skilled in the art will also appreciate that according to another embodiment, a power controller circuit is provided that comprises a low voltage detection circuit to process a rectified input voltage from at least one alternating current (AC) voltage source. The low voltage detection circuit may be configured to output a low voltage indication signal upon detection of an initiation of an increase in the rectified input voltage. The power controller circuit may also include a driver circuit configured to receive a signal representative of the low voltage indication signal and, in response, to output a drive signal to the switch control input of the power switch to turn on the power switch.

The power controller circuit may also include a low voltage synchronization circuit configured to receive and condition the low voltage indication signal and to output a conditioned low voltage indication signal as the signal representative of the low voltage indication signal to the driver circuit. The rectified input voltage may comprise a first rectified AC input voltage that is combined with a second rectified AC input voltage. The low voltage detection circuit may comprise a comparator circuit configured to receive the rectified AC voltage and to detect the initiation of an increase in the rectified AC voltage. The driver circuit may comprise a comparator circuit having a first input configured to receive the signal representative of the low voltage indication signal, a second input connected to a reference voltage source, and a first output configured to output the drive signal in response to receiving a voltage at the first input that satisfies voltage threshold defined, at least in part, by the reference voltage. The power controller circuit may include a diode having a first port configured to receive the low voltage indication signal and a second port connected to the first input of the comparator circuit. The comparator circuit may comprise a hysteretic comparator circuit. The power controller circuit may also include a discharge control circuit configured to receive the low voltage indication signal and, if the low voltage indication signal is not received for a predetermined time period, to output a discharge signal to cause the power switch to turn on to discharge a capacitor. The power controller circuit may be implemented as a semiconductor device that also includes the power switch.

Those skilled in the art will also appreciate that according to yet another embodiment, a method of forming a semiconductor device for providing a regulated output may comprise providing a low voltage detection circuit to receive a combined rectified alternating current (AC) voltage provided by a first rectified AC input voltage combined with a second rectified AC input voltage; providing a transistor having a control electrode, a first current carrying electrode configured to receive the combined rectified AC voltage, and a second current carrying electrode to be connected to a load; configuring the low voltage detection circuit to output a low voltage indication signal upon detection of an initiation of an increase in the combined rectified AC voltage; configuring a low voltage synchronization circuit to receive the low voltage indication signal and to output a synchronization pulse; and configuring a hysteretic regulator circuit to receive the synchronization pulse and, in response, to output a drive signal to the control electrode of the transistor switch to turn on the transistor. The method may further comprise configuring a first input of the hysteretic regulator circuit to receive the synchronization pulse; and configuring the hysteretic regulator circuit to output the drive signal in response to receiving a voltage at the first input that satisfies threshold voltage defined, at least in part, by a reference voltage. The method may further comprise configuring a first port of a diode forming at least part of the low voltage synchronization to receive the low voltage indication signal; and connecting a second port of the diode forming at least part of the low voltage synchronization to the first input of the hysteretic regulator circuit. The method may further comprise configuring a discharge control circuit to receive the low voltage indication signal and, if the low voltage indication signal is not received for a predetermined time period, to output a discharge signal to cause the transistor to turn on to discharge a capacitor.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

What is claimed is:

1. A power controller circuit configured to control a power switch that provides a regulated output and has a switch control input, comprising:
   a low voltage detection circuit to receive a combined rectified alternating current (AC) voltage provided by a first rectified AC input voltage combined with a second rectified AC input voltage;
   said low voltage detection circuit configured to output a low voltage indication signal upon detection of an initiation of an increase of the combined rectified AC voltage said low voltage synchronization circuit including a diode having a first port configured to receive the low voltage indication signal and a second port;
   a low voltage synchronization circuit configured to receive and condition the low voltage indication signal and to output a synchronization pulse; and
   a hysteretic regulator circuit configured to receive the synchronization pulse and, in response, to output a drive signal to the switch control input of the power switch to turn on the power switch, said hysteretic regulator circuit having a comparator circuit comprising:
   a first input configured to receive the synchronization pulse and coupled to said second port of said diode of said low voltage detection circuit;
   a second input coupled to a reference voltage source; and a first output configured to output the drive signal in response to receiving a voltage at said first input that satisfies a voltage threshold defined, at least in part, by the reference voltage.

2. A power controller circuit configured to control a power switch that provides a regulated output and has a switch control input, comprising:
- a low voltage detection circuit to receive a combined rectified alternating current (AC) voltage provided by a first rectified AC input voltage combined with a second rectified AC input voltage;
- said low voltage detection circuit configured to output a low voltage indication signal upon detection of an initiation of an increase of the combined rectified AC voltage;
- a low voltage synchronization circuit configured to receive and condition the low voltage indication signal and to output a synchronization pulse;
- a regulator circuit configured to output a drive signal to the switch control input of the power switch to turn on the power switch; and
- a discharge control circuit configured to receive the low voltage indication signal and, if the low voltage indication signal is not received for a predetermined time period, to output a discharge signal to cause the power switch to turn on to discharge a capacitor.

3. The power controller circuit according to claim 2, wherein said hysteretic regulator circuit is configured to receive the discharge signal and, in response, to output the drive signal to turn on the power switch to discharge the capacitor.

4. The power controller circuit according to claim 2, wherein the power switch comprises a transistor having first current carrying electrode configured to receive the combined rectified AC voltage.

5. The power controller circuit according to claim 2, wherein said low voltage detection circuit comprises a comparator circuit configured to receive the combined rectified AC voltage and to detect the initiation of an increase in the combined rectified AC voltage.

6. A power controller circuit configured to control a power switch that provides a regulated output and has a switch control input, comprising:
- a low voltage detection circuit to process a rectified input voltage from at least one alternating current (AC) voltage source;
- said low voltage detection circuit configured to output a low voltage indication signal upon detection of an initiation of an increase in the rectified input voltage;
- a driver circuit configured to output a drive signal to the switch control input of the power switch to turn on the power switch; and
- a discharge control circuit configured to receive the low voltage indication signal and, if the low voltage indication signal is not received for a predetermined time period, to output a discharge signal to cause the power switch to turn on to discharge a capacitor.

7. The power controller circuit according to claim 6, further comprising a low voltage synchronization circuit configured to receive and condition the low voltage indication signal and to output a conditioned low voltage indication signal as the signal representative of the low voltage indication signal to said driver circuit.

8. The power controller circuit according to claim 6, wherein the rectified input voltage comprises a first rectified AC input voltage that is combined with a second rectified AC input voltage.

9. The power controller circuit according to claim 6, wherein said low voltage detection circuit comprises a comparator circuit configured to receive the rectified AC voltage and to detect the initiation of an increase in the rectified AC voltage.

10. The power controller circuit according to claim 6, wherein driver circuit comprises:
- a comparator circuit having a first input configured to receive the signal representative of the low voltage indication signal,
- a second input connected to a reference voltage source; and
- a first output configured to output the drive signal in response to receiving a voltage at said first input that satisfies a voltage threshold defined, at least in part, by the reference voltage.

11. The power controller circuit according to claim 10, further comprising a diode having a first port configured to receive the low voltage indication signal and a second port connected to said first input of said comparator circuit.

12. The power controller circuit according to claim 10, wherein said comparator circuit comprises a hysteretic comparator circuit.

13. The power controller circuit according to claim 6, which is implemented as a semiconductor device that also includes the power switch.

14. A method of forming a semiconductor device for providing a regulated output, comprising:
- providing a low voltage detection circuit to receive a combined rectified alternating current (AC) voltage provided by a first rectified AC input voltage combined with a second rectified AC input voltage;
- providing a transistor having a control electrode, a first current carrying electrode configured to receive the combined rectified AC voltage, and a second current carrying electrode to be connected to a load;
- configuring the low voltage detection circuit to output a low voltage indication signal upon detection of an initiation of an increase in the combined rectified AC voltage;
- configuring a low voltage synchronization circuit to receive the low voltage indication signal and to output a synchronization pulse;
- configuring a regulator circuit to receive the synchronization pulse and, in response, to output a drive signal to the control electrode of the transistor switch to turn on the transistor; and
- a discharge control circuit to receive the low voltage indication signal and, if the low voltage indication signal is not received for a predetermined time period, to output a discharge signal to cause the transistor to turn on to discharge a capacitor.

15. The method according to claim 14, further comprising:
- configuring a first input of the hysteretic regulator circuit to receive the synchronization pulse; and
- configuring the hysteretic regulator circuit to output the drive signal in response to receiving a voltage at the first input that satisfies a threshold voltage defined, at least in part, by a reference voltage.

16. The power controller circuit according to claim 15, further comprising:
- configuring a first port of a diode forming at least part of the low voltage synchronization to receive the low voltage indication signal; and
- connecting a second port of the diode forming at least part of the low voltage synchronization to the first input of the hysteretic regulator circuit.

* * * * *